(12) United States Patent
Adell et al.

(10) Patent No.: US 10,576,910 B1
(45) Date of Patent: Mar. 3, 2020

(54) SELF-RETAINING DOOR EDGE GUARD

(71) Applicants: Loren S. Adell, Sunnyvale, TX (US);
Marvin M. Adell, Sunnyvale, TX (US);
Michael L. Adell, Sunnyvale, TX (US)

(72) Inventors: Loren S. Adell, Sunnyvale, TX (US);
Marvin M. Adell, Sunnyvale, TX (US);
Michael L. Adell, Sunnyvale, TX (US)

(73) Assignee: ADELL GROUP, INC., New York, NY (US)

( * ) Notice: Subject to any disclaimer, the term of this patent is extended or adjusted under 35 U.S.C. 154(b) by 266 days.

(21) Appl. No.: 15/591,137

(22) Filed: May 10, 2017

(51) Int. Cl.
*B60R 13/04* (2006.01)
*B32B 3/28* (2006.01)
*B21D 39/02* (2006.01)
*B32B 15/082* (2006.01)
*B32B 37/15* (2006.01)

(52) U.S. Cl.
CPC ............ *B60R 13/043* (2013.01); *B21D 39/02* (2013.01); *B32B 3/28* (2013.01); *B32B 15/082* (2013.01); *B32B 37/153* (2013.01); *B32B 2250/02* (2013.01); *B32B 2255/10* (2013.01); *B32B 2571/00* (2013.01); *B32B 2605/08* (2013.01)

(58) Field of Classification Search
CPC ... B60R 13/043; B32B 37/153; B32B 15/082; B32B 3/28; B32B 2605/08; B32B 2571/00; B32B 2255/10; B32B 2250/02; B21D 39/02
USPC .......................................................... 49/462
See application file for complete search history.

(56) References Cited

U.S. PATENT DOCUMENTS

| | | | | |
|---|---|---|---|---|
| 3,547,515 A | * | 12/1970 | Shanok ................. | B60R 13/043 359/549 |
| 4,259,812 A | * | 4/1981 | Adell .................... | B60R 13/043 428/122 |
| 4,271,633 A | * | 6/1981 | Adell .................... | B60R 13/043 49/462 |
| 4,316,348 A | * | 2/1982 | Adell .................... | B60R 13/043 428/122 |
| 4,334,700 A | * | 6/1982 | Adell .................... | B60R 13/043 280/770 |
| 4,338,148 A | * | 7/1982 | Adell .................... | B60R 13/043 156/216 |
| 4,365,450 A | * | 12/1982 | Adell .................... | B60R 13/043 428/122 |
| 4,372,083 A | * | 2/1983 | Hatzikelis ............. | B60R 13/043 29/458 |
| 4,379,376 A | * | 4/1983 | Adell .................... | B60R 13/043 428/122 |
| 4,379,377 A | * | 4/1983 | Adell .................... | B60R 13/043 428/122 |
| 4,387,125 A | * | 6/1983 | Adell .................... | B60R 13/043 293/128 |
| 4,429,013 A | * | 1/1984 | Adell .................... | B60R 13/043 293/128 |
| 4,437,916 A | * | 3/1984 | Adell .................... | B60R 13/043 156/201 |
| 4,457,112 A | * | 7/1984 | Adell .................... | B60R 13/043 49/462 |

(Continued)

*Primary Examiner* — Brent W Herring
(74) *Attorney, Agent, or Firm* — George L. Boller (57) ABSTRACT

A door edge guard has a transverse cross section in which a corner edge of a laminated strip from which the door edge guard is formed applies retention force against an inside-facing surface of a door edge.

14 Claims, 7 Drawing Sheets

(56) References Cited

U.S. PATENT DOCUMENTS

| | | | | |
|---|---|---|---|---|
| 4,520,593 A * | 6/1985 | Adell | ............. | B60R 13/043 49/462 |
| 4,520,594 A * | 6/1985 | Adell | ............. | B32B 15/08 49/462 |
| 4,547,994 A * | 10/1985 | Adell | ............. | B60R 13/043 156/244.11 |
| 4,555,870 A * | 12/1985 | McKinnon | ............. | B60R 13/043 49/462 |
| 4,570,383 A * | 2/1986 | Adell | ............. | B60R 13/043 49/462 |
| 4,587,762 A * | 5/1986 | Adell | ............. | B60R 13/043 49/462 |
| 4,604,832 A * | 8/1986 | Adell | ............. | B60R 13/043 428/122 |
| D289,890 S * | 5/1987 | Adell | ............. | D12/190 |
| 4,679,290 A * | 7/1987 | Adell | ............. | B60R 13/043 29/407.09 |
| 4,682,442 A * | 7/1987 | Adell | ............. | B60R 13/043 428/122 |
| 4,730,415 A * | 3/1988 | Adell | ............. | B60R 13/043 49/462 |
| 4,753,041 A * | 6/1988 | Adell | ............. | B60R 13/043 29/469.5 |
| 4,773,184 A * | 9/1988 | Adell | ............. | B60R 13/043 49/462 |
| 4,787,175 A * | 11/1988 | Adell | ............. | B60R 13/043 49/462 |
| 4,817,335 A * | 4/1989 | Adell | ............. | B60R 13/043 49/462 |
| 7,368,074 B2 * | 5/2008 | Omori | ............. | B32B 25/08 264/45.9 |
| 2005/0112301 A1 * | 5/2005 | Omori | ............. | B32B 25/08 428/31 |
| 2005/0233110 A1 * | 10/2005 | Miyakawa | ............. | B32B 3/04 428/122 |
| 2013/0061531 A1 * | 3/2013 | Adell | ............. | B60R 13/043 49/490.1 |
| 2015/0224757 A1 * | 8/2015 | Sassmannshausen | ............. | F16B 11/006 156/216 |

* cited by examiner

SELF-RETAINING DOOR EDGE GUARD

TECHNICAL FIELD

This invention relates to door edge guards which are self-retaining when fitted onto and protecting trailing edges of automotive vehicle doors.

BACKGROUND

A door edge guard protects the trailing edge of an automotive vehicle door from damage, paint chipping for example, which might otherwise be caused by the trailing edge striking an object which is present in the trailing edge's path when the door is swung open. A door edge guard which is self-retaining relies on metal of a metal body to provide self-retention without separate fasteners or adhesives.

A typical automotive vehicle door edge comprises a margin of an outer door panel being wrapped around and clinched onto a margin of an inner door panel. That construction creates what is sometimes called a door hem flange. The procedure for installing a door edge guard on a vehicle door edge is not complicated. It is typically performed by aligning an open throat of a door edge guard with a door hem flange and using a mallet which will not damage the door edge guard to carefully pound the door edge guard onto the door hem flange. A door edge guard may have a long dimension (length) for fitting to the entire length of a door edge, or a long dimension for fitting to only a fraction of the door edge length.

Self-retention force is developed by elastic deformation of the original cross sectional shape of the door edge guard's metal. Such deformation can occur in various ways which depend on the specific design of the door edge guard. For example, the sides may resiliently spread apart as the door edge is being installed.

A door edge guard is typically installed on a door edge only after the door itself has been finished and painted. In order to prevent installation of a door edge guard from disrupting the construction of a finished door along the door edge, such as by displacing sealant which seals the inner door panel to the outer door panel or by marring the paint finish, a thin non-metallic layer is applied to the surface of the door edge guard metal along at least surface portions which will come into contact with the door edge. The non-metallic layer may be applied to additional surface portions as well, even to the point of application of all surfaces, including surfaces which would be considered edges. Such lamination of a non-metallic layer to the metal is commonly performed by extrusion or co-extrusion of non-metallic material onto flat sheet metal stock to create a lamination which is subsequently formed to a finished cross sectional shape. Such forming is commonly performed by machinery which has a series of rollers which roll-form form the flat laminated stock to a desired cross sectional shape.

In many instances a door edge to which a door edge guard is to be fit has a lengthwise contour which conforms the edge to the styling of a vehicle. Such contours are typically other than straight and may have several sections of different contour along the length of the door edge guard. There may be distinct peaks and/or recesses where sections of different contour meet. Notching and overbending are procedures which have been used in door edge guard manufacture in order to enable the contour of a door edge guard, when installed, to conform to that of the door edge and to develop specified self-retention force which assures that the door edge guard properly retains itself on the door edge.

SUMMARY THE DISCLOSURE

One generic aspect of the disclosed embodiments of door edge guard relates to a metal strip which has length, width, and thickness, a first lengthwise side surface and a second lengthwise side surface which are widthwise opposite each other, a first lengthwise margin which comprises the first lengthwise side surface, a second lengthwise margin which comprises the second lengthwise side surface, and the strip having a transverse cross section which when viewed in a direction looking at the thickness of the metal strip is seen to comprise a) the first second lengthwise margin having a first section adjoining the second lengthwise side surface, a second section confronting the section, and a reverse bend through which the first section joins the second section, b) a curl which joins the second section at a location opposite the reverse bend, which curls in excess Zof 180° from the second section to cause the first lengthwise side surface to face toward one of the first and second sections which is nearer the first lengthwise side surface, the second section extending linearly away from the curl to the reverse bend, the first lengthwise side surface and the first lengthwise margin meeting at an outer corner and an inner corner, the latter corner being disposed nearer the one of the first and second sections which is nearer the first lengthwise side surface, the one of the first and second sections which is nearer the first lengthwise side surface having a first flat surface which faces the first lengthwise side surface and a second flat surface which is opposite the first flat surface, the second flat surface confronting a surface of the other of the first and second sections, and c) a non-metallic layer having a first zone covering the inner corner, a portion of the first lengthwise side surface adjoining the inner corner, and a portion of the first lengthwise margin adjoining the inner corner, the non-metallic layer having a second zone covering the first flat surface, the shortest distance from the first zone at the inner corner to the second zone where the second zone covers the first flat surface being coincident with an imaginary line which extends from the first zone at the inner corner and is perpendicular to the first flat surface, the shortest distance defining a throat opening which, upon initial advancement of the door edge guard onto a trailing edge of an automotive vehicle door, will become increasingly larger as the cross section expands with flexing of the curl to cause a trailing edge of an automotive vehicle door to be gripped between the first zone at the inner corner and the second zone covering the first flat surface during final advancement of the door edge guard onto a trailing edge of a an automotive vehicle door.

Another generic aspect relates to a method of manufacturing a door edge guard.

Another generic aspect relates to a method of installing a door edge guard on an edge of a door of a motor vehicle.

The foregoing summary, accompanied by further detail of the disclosure, will be presented in the Detailed Description below with reference to the following drawings that are part of this disclosure.

DETAILED DESCRIPTION

Figure 1:
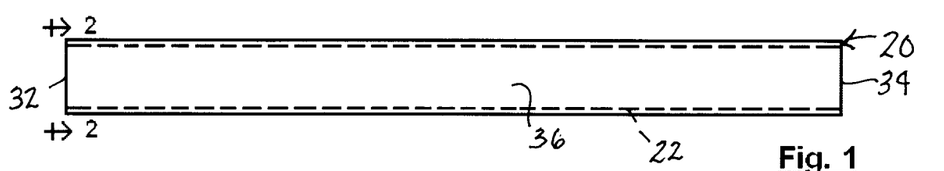
FIG. 1 is a plan view of a strip having a metal core and non-metallic material covering exterior surfaces of the metal core.
Figures 2, 3:
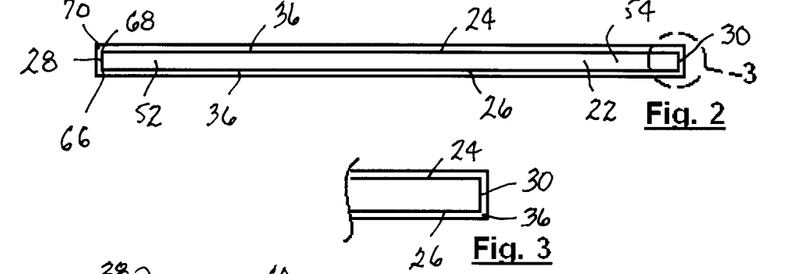
FIG. 2 is an enlarged end view of the strip in the direction of arrows 2-2 in FIG. 1 and rotated 90° counterclockwise, a portion of the strip being broken away.
FIG. 3 is an enlarged view in circle 3 of FIG. 2.

FIGS. 1 and 2 show a flat rectangular strip 20 which has been cut from a longer strip. How the longer strip is fabricated will be discussed later. Strip 20 comprises a metal core 22 having a length, a width, a thickness, and a rectangular transverse cross section defined by a top surface 24, a bottom surface 26, a first side surface 28, and a second side surface 30. Top surface 24 and bottom surface 26 are opposite each other in the direction of the thickness of metal core 22 and side surfaces 28, 30 are widthwise opposite each other. Metal core 22 has end surfaces 32, 34 at opposite lengthwise ends.

A non-metallic layer 36 is in full surface-to-surface contact with surfaces 24, 26, 28 and 30 to fully enclose those four surfaces, thereby making strip 20 a lamination comprising a layer of non-metallic material laminated to metal core 22 while leaving end surfaces 32 and 34 of core 22 as bare metal. Non-metallic material also covers each of the four edges at the four corners where one surface meets another.

FIGS. 4 and 7-10 are transverse cross sections of respective door edge guards 38, 40, 42, 44, and 46 which have been formed from strips like strip 20 and are intended to fit the trailing edge of a right side door of an automotive vehicle, it being understood that specific dimensions of a strip from which a particular door edge guard has been formed may differ from those of another strip from which a different door edge guard has been formed. The thickness of non-metallic layer 36 is less than that of metal core 22. Thickness of non-metallic layer 36 is not specifically shown in FIGS. 4 and 7-10, but should be understood to be present in the door edge guards. While thickness of non-metallic layer 36 is separately shown in FIGS. 1-3 for the purpose of illustration, dimensions of both non-metallic layer 36 and metal core 22 should be understood to be neither necessarily to scale nor in relative proportion to each other.

FIGS. 1-3 show that metal core 22 also has a first lengthwise margin 52 which comprises first side surface 28, and a second lengthwise margin 54 which comprises second side surface 30.

Second margin 54 has several sections which, after strip 20 has been formed to the transverse cross section of door edge guard 38 shown in FIG. 4, relate to door edge guard 38 as follows.

Second margin 54 has a first section 56 adjoining second side surface 30, a second section 58 confronting first section 56, and a reverse bend 60 through which first section 56 joins second section 58. A curl 62 joins second section 58 at a location opposite a location where second section 58 joins reverse bend 60. Curl 62 curls in excess of 180° from second section 58 to cause first side surface 28 to face toward second section 58, which is nearer first side surface 28 than is first section 56.

Figure 5:
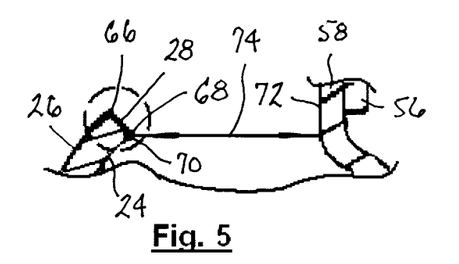
FIG. 5 is an enlarged fragmentary view of a portion of FIG. 4.
Figure 6:
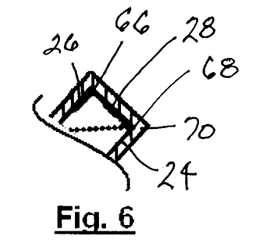
FIG. 6 is an enlarged view within circle 6 in FIG. 5.

As shown in FIGS. 5 and 6, first side surface 28 and first margin 52 meet at an outer corner 66 and an inner corner 68, the latter corner being disposed nearer second section 58 than first section 56.

Figure 14:
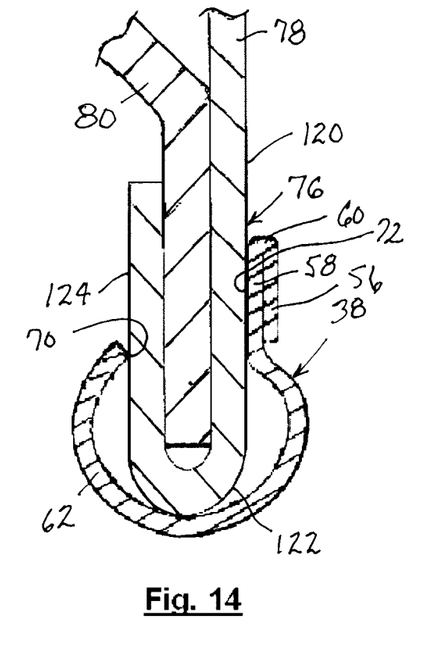
FIG. 14 is a transverse cross section view showing a door edge guard like the one in FIG. 4 installed on a trailing edge of a vehicle door.

A first zone 70 of non-metallic layer 36 covers inner corner 68, an adjoining portion of first side surface 28, and an adjoining portion of second margin 54 along surface 24. A second zone 72 of layer 36 covers the surface of second section 58 which faces inner corner 68. The shortest distance from first zone 70 at inner corner 68 to second zone 72 defines a throat opening 74 which will become increasingly larger as the cross section elastically deforms when first zone 70 at inner corner 68 and second zone 72 have come into contact with, and are moving along opposite sides of, a trailing edge of a vehicle door, as the door edge guard is being installed. FIG. 14 shows door edge guard 38 installed on a door edge 76 formed by wrapping a margin of an outer door panel 78 around, and clinching it onto, a margin of an inner door panel 80. An exterior surface of outer door panel 78 forms an outside-facing surface 120 of door edge 76, a rounded end surface 122 of door edge 76, and an inside-facing surface 124 of door edge 76. Respective portions of an interior surface of outer door panel 78 clinch against opposite surfaces of the margin of inner door panel 80.

Figure 11:
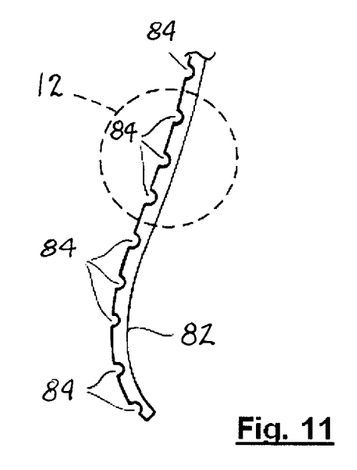
FIG. 11 is left side view of a section of a door edge guard which curves along its length.
Figure 12:
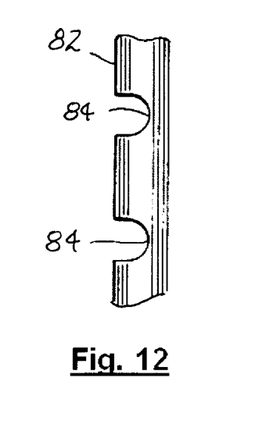
FIG. 12 is an enlarged fragmentary view within a portion of circle 12 in FIG. 11.
Figure 13:
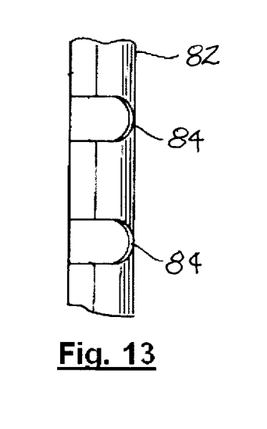
FIG. 13 shows a modification of the edge guard shown in FIG. 12.

As mentioned earlier, a door edge guard may curve along its length to conform to a door edge which is similarly curved along its length. FIG. 11 shows a section of a generic door edge guard 82 which is intended to fit the trailing edge of a right side door of an automotive vehicle. Door edge guard 82 is representative of one having any of the transverse cross sections shown in FIGS. 4, and 7-10 which curves along its length in either two or three dimensions. In order to allow those cross sections to be formed to the proper curvature, a portion of a door edge guard may contain one or more notches 84 which are shown in more detail in FIGS. 12 and 13 and whose depths extend transversely of the door edge guard length. While each FIGS. 12 and 13 show its notches 84 as identical in size and shape, and uniformly spaced apart along the long dimension (length) of door edge guard 82, those notches are intended to be representative of and not necessarily specific to any particular door edge guard. Consequently, it is to be understood that the size, shape, and location of any notch in any specific door edge guard depends on the curvature of the particular door edge guard onto which the door edge guard is to fit. FIGS. 11 and 12 show notches 84 in that portion of the door edge guard which cannot be seen from the exterior of a vehicle, when the door edge guard is installed on the trailing edge of a right side door and the door is closed. The notches in FIG. 13 extend into the door edge guard more deeply than those in FIGS. 11 and 12.

Figure 4:
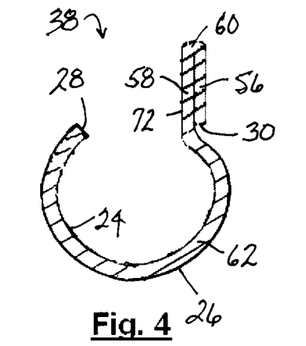
FIG. 4 a transverse cross section view of a door edge guard which has been formed from a metal strip like the one in FIGS. 1 and 2.
Figure 7:
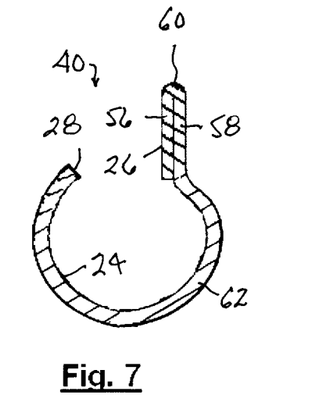
FIG. 7 is a transverse cross section view of another door edge guard which has been formed from a strip like the one in FIGS. 1 and 2.

Door edge guard 40 in FIG. 7 differs from door edge guard 38 in FIG. 4 in that reverse bend 60 is created in door edge guard 40 by bending margin 54 in the opposite direction from the direction in which margin 54 was bent to create reverse bend 60 in door edge guard 38. Unlike the direction of bending which places second section 58 rather than first section 56 nearer first side surface 28 in door edge guard 38, this opposite direction of bending places first section 56 rather than second section 58 nearer first side surface 28. Throat opening 74 is the shortest distance from the same first zone 70 of non-metallic material at inner corner 68 to a second zone 72 of non-metallic material which in door edge guard 40 is now the non-metallic material on surface 26 of section 56.

Figure 8:
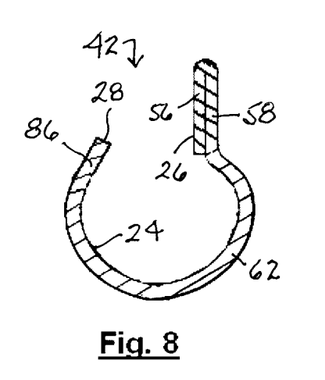
FIG. 8 is a transverse cross section view of another door edge guard which has been formed from a strip like the one in FIGS. 1 and 2.

Door edge guard 42 in FIG. 8 differs from door edge guard 40 in that curl 62, after having curled in excess of 180° from second section 58, ends before first side surface 28. A section 86 of first margin 52 which comprises first side surface 28 extends linearly a short distance from the end of curl 62 instead of continuing the curl. The throat opening is the shortest distance from first zone 70 of non-metallic material at inner corner 68 to second zone 72 of non-metallic material on surface 26 of section 56.

Figure 9:
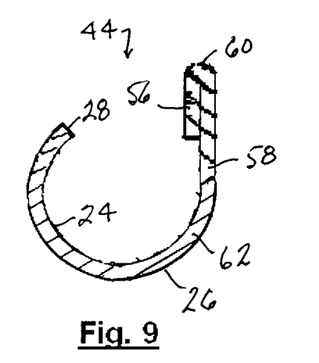
FIG. 9 is a transverse cross section view of another door edge guard which has been formed from a strip like the one in FIGS. 1 and 2.
Figure 15:
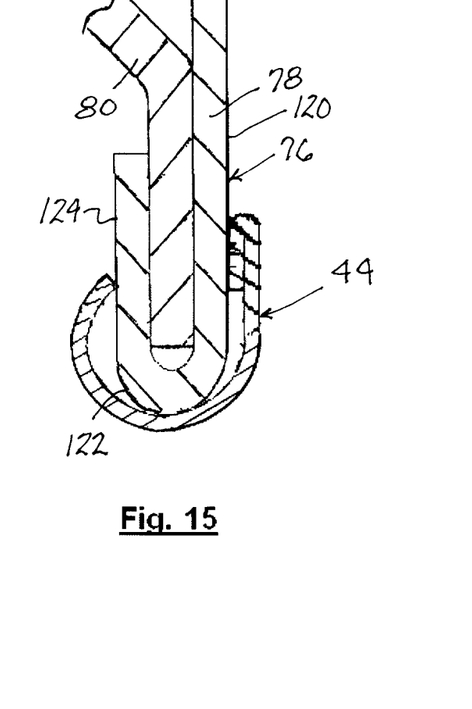
FIG. 15 is a transverse cross section view showing a door edge guard like the one in FIG. 9 installed on a trailing edge of a vehicle door.

Door edge guard 44 in FIG. 9 differs from door edge guard 40 in FIG. 7 in that section 58 is longer between the location where it joins with reverse bend 60 and the location where it joins with curl 62 and in that curl 62 while still curling at least 180° curls less than curl 62 of door edge guard 40. The throat opening is the shortest distance from the first zone of non-metallic material at inner corner 68 to the second zone of non-metallic material on surface 26 of section 56. FIG. 15 shows door edge guard 44 installed on a door edge 76.

Figure 10:
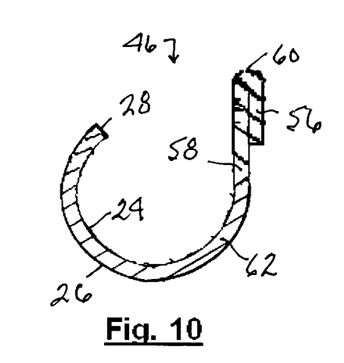
FIG. 10 is a transverse cross section view of another door edge guard which has been formed from a strip like the one in FIGS. 1 and 2.

Door edge guard 46 in FIG. 10 is like door edge guard 44 except for section 56 being bent in the opposite direction to form reverse bend 60. The throat opening is the shortest distance from the first zone of non-metallic material at inner corner 68 to the second zone of non-metallic material on surface 24 of section 58.

Figure 16:
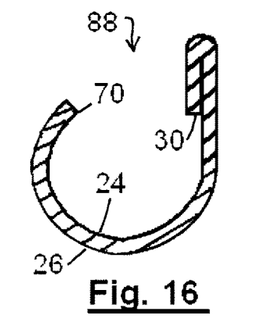
FIG. 16 is a transverse cross section view showing another door edge guard.
Figure 17:
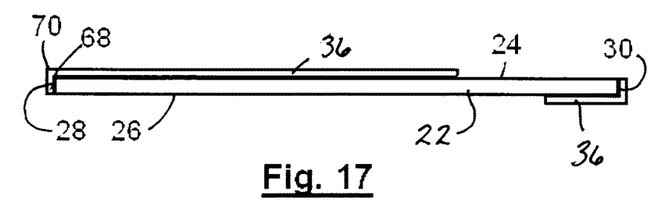
FIG. 17 is a view in the same direction as that of FIG. 2 showing the strip from which the edge guard of Frig. 16 is formed.

FIG. 16 shows a door edge guard 88 having its metal core 22 formed to the same transverse cross section as that of FIG. 9, but having non-metallic layer 36 selectively covering metal core 22 so as to completely cover surfaces 28 and 30 while partially covering surfaces 24 and 26 to leave remaining portions of those two surfaces uncovered. FIG. 17 shows detail of the selective covering on metal core 22 before the strip is formed to the shape shown in FIG. 16.

Figure 18:
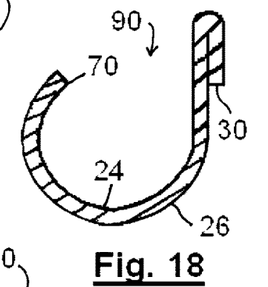
FIG. 18 is a transverse cross section view showing another door edge guard.
Figure 19:
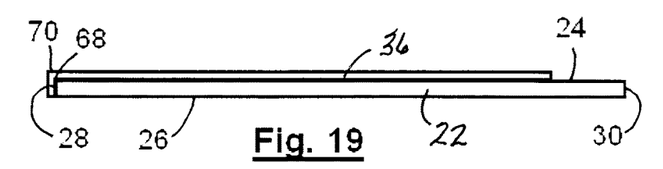
FIG. 19 is a view in the same direction as that of FIG. 2 showing the strip from which the edge guard of FIG. 18 is formed.

FIG. 18 shows a door edge guard 90 having its metal core 22 formed to the same transverse cross section as that of FIG. 10, but having non-metallic layer 36 selectively covering metal core 22 so as to completely cover surface 28 and partially cover surface 24 while leaving surfaces 26 and 30 completely uncovered. FIG. 19 shows detail of the selective covering on metal core 22 before the strip is formed to the shape shown in FIG. 18.

Figure 20:
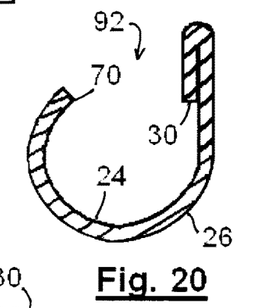
FIG. 20 is a transverse cross section view showing another door edge guard.
Figure 21:
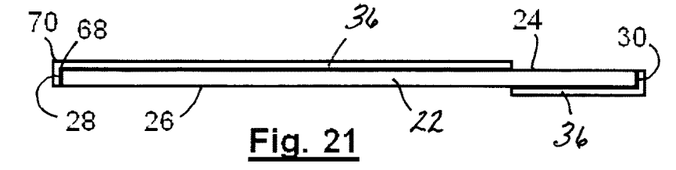
FIG. 21 is a view in the same direction as that of FIG. 2 showing the strip from which the edge guard of FIG. 20 is formed.

FIG. 20 shows a door edge guard 92 having its metal core 22 formed to the same transverse cross section as that of FIG. 9, but having non-metallic layer 36 selectively covering metal core 22 so as to completely cover surfaces 28 and 30 while partially covering surfaces 24 and 26 to leave remaining portions of those two surfaces uncovered. FIG. 21 shows detail of the selective covering on metal core 22 before the strip is formed to the shape shown in FIG. 20.

Figure 22:
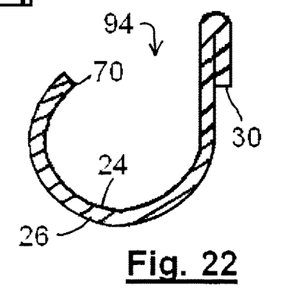
FIG. 22 is a transverse cross section view showing another door edge guard.
Figure 23:
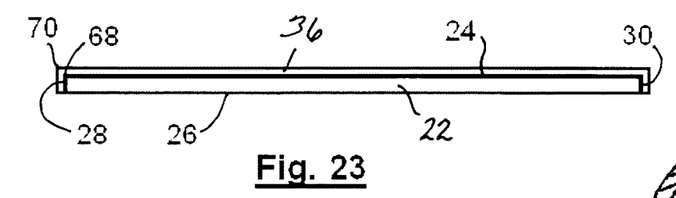
FIG. 23 is a view in the same direction as that of FIG. 2 showing the strip from which the edge guard of FIG. 22 is formed.

FIG. 22 shows a door edge guard 94 having its metal core 22 formed to the same transverse cross section as that of FIG. 10, but having non-metallic layer 36 selectively covering metal core 22 so as to completely cover surfaces 24, 28, and 30 while leaving surface 26 completely uncovered. FIG. 23 shows detail of the selective covering on metal core 22 before the strip is formed to the shape shown in FIG. 22.

Figures 24, 25, 26, 27, 28, 29, 30, 31:
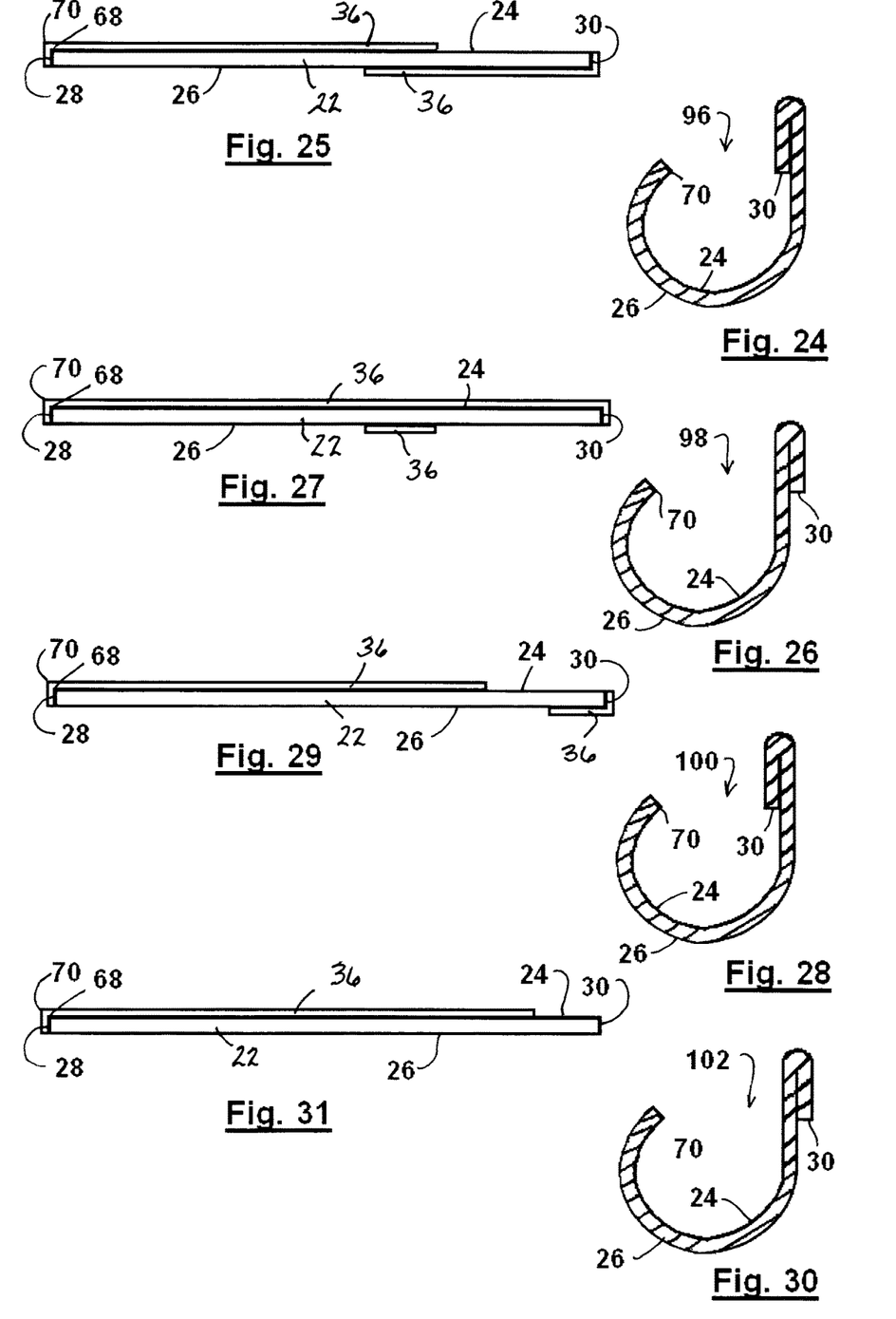
FIG. 24 is a transverse cross section view showing another door edge guard.
FIG. 25 is a view in the same direction as that of FIG. 2 showing the strip from which the edge guard of FIG. 24 is formed.
FIG. 26 is a transverse cross section view showing another door edge guard.
FIG. 27 is a view in the same direction as that of FIG. 2 showing the strip from which the edge guard of FIG. 26 is formed.
FIG. 28 is a transverse cross section view showing another door edge guard.
FIG. 29 is a view in the same direction as that of FIG. 2 showing the strip from which the edge guard of FIG. 28 is formed.
FIG. 30 is a transverse cross section view showing another door edge guard.
FIG. 31 is a view in the same direction as that of FIG. 2 showing the strip from which the edge guard of FIG. 30 is formed.

FIG. 24 shows a door edge guard 96 having its metal core 22 formed to the same transverse cross section as that of FIG. 9, but having non-metallic layer 36 selectively covering metal core 22 so as to completely cover surfaces 28 and 30 while partially covering surfaces 24 and 26 to leave remaining portions of those two surfaces uncovered. FIG. 25 shows detail of the selective covering on metal core 22 before the strip is formed to the shape shown in FIG. 24.

FIG. 26 shows a door edge guard 98 having its metal core 22 formed to the same transverse cross section as that of FIG. 10, but having non-metallic layer 36 selectively covering metal core 22 so as to completely cover surfaces 24, 28, and 30 while partially covering surface 26 to leave the remainder of that surface uncovered, FIG. 27 shows detail of the selective covering on metal core 22 before the strip is formed to the shape shown in FIG. 26.

FIG. 28 shows a door edge guard 100 having its metal core 22 formed to the same transverse cross section as that of FIG. 9, but having non-metallic layer 36 selectively covering metal core 22 so as to completely cover surfaces 28 and 30 while partially covering surfaces 24 and 26 to leave remaining portions of those two surfaces uncovered. FIG. 29 shows detail of the selective covering on metal core 22 before the strip is formed to the shape shown in FIG. 28.

FIG. 30 shows a door edge guard 102 having its metal core 22 formed to the same transverse cross section as that of FIG. 10, but having non-metallic layer 36 selectively covering metal core 22 so as to completely cover surface 28, to partially cover surface 24 and leave the remainder of that surface uncovered while also leaving surfaces 26 and 30 completely uncovered. FIG. 31 shows detail of the selective covering on metal core 22 before the strip is formed to the shape shown in FIG. 30.

Figure 32:
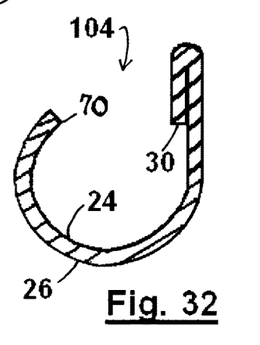
FIG. 32 is a transverse cross section view showing another door edge guard.
Figure 33:
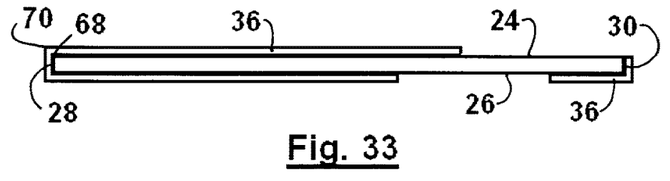
FIG. 33 is a view in the same direction as that of FIG. 2 showing the strip from which the edge guard of FIG. 32 is formed.

FIG. 32 shows a door edge guard 104 having its metal core 22 formed to the same transverse cross section as that of FIG. 9, but having non-metallic layer 36 selectively covering metal core 22 so as to completely cover surfaces 28 and 30 while partially covering surfaces 24 and 26 to leave remaining portions of those two surfaces uncovered. FIG. 33 shows detail of the selective covering on metal core 22 before the strip is formed to the shape shown in FIG. 32.

Figure 34:
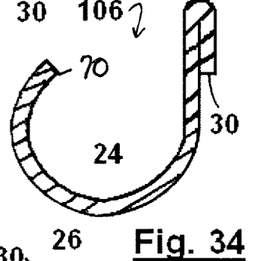
FIG. 34 is a transverse cross section view showing another door edge guard.
Figure 35:
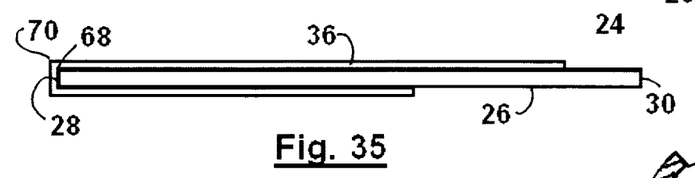
FIG. 35 is a view in the same direction as that of FIG. 2 showing the strip from which the edge guard of FIG. 34 is formed.

FIG. 34 shows a door edge guard 106 having its metal core 22 formed to the same transverse cross section as that of FIG. 10, but having non-metallic layer 36 selectively covering metal core 22 so as to completely cover surface 28 while partially covering surfaces 24 and 26 to leave the remainder of those surfaces uncovered and also leave surface 30 completely uncovered. FIG. 35 shows detail of the selective covering on metal core 22 before the strip is formed to the shape shown in FIG. 34.

Figure 36:
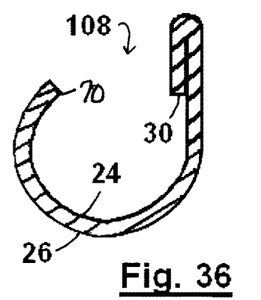
FIG. 36 is a transverse cross section view showing another door edge guard.
Figure 37:
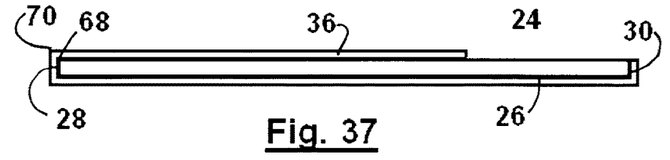
FIG. 37 is a view in the same direction as that of FIG. 2 showing the strip from which the edge guard of FIG. 36 is formed.

FIG. 36 shows a door edge guard 108 having its metal core 22 formed to the same transverse cross section as that of FIG. 9, but having non-metallic layer 36 selectively covering metal core 22 so as to completely cover surfaces 26, 28, and 30 while partially covering surface 24 to leave the remaining portion of that surface uncovered. FIG. 37 shows detail of the selective covering on metal core 22 before the strip is formed to the shape shown in FIG. 36.

Figure 38:
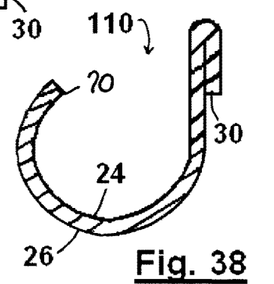
FIG. 38 is a transverse cross section view showing another door edge guard.
Figure 39:
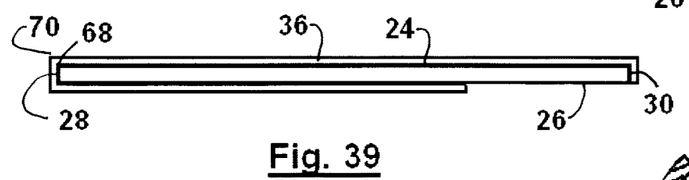
FIG. 39 is a view in the same direction as that of FIG. 2 showing the strip from which the edge guard of FIG. 38 is formed.

FIG. 38 shows a door edge guard 110 having its metal core 22 formed to the same transverse cross section as that of FIG. 10, but having non-metallic layer 36 selectively covering metal core 22 so as to completely cover surfaces 24, 28, and 30 while partially covering surface 26 to leave the remainder of that surface uncovered. FIG. 39 shows detail of the selective covering on metal core 22 before the strip is formed to the shape shown in FIG. 38.

Door edge guards 88-110 are intended to fit the trailing edge of a right side door of an automotive vehicle. All door edge guards, when installed, with the exception of door edge guards 108 and 110, leave the metal of core 22 visible to some degree when the closed door is viewed from the exterior of the vehicle. Door edge guards 88, 90, 100, and 102 leave essentially only the metal of core 22 visible. Door edge guards 92, 94, 96, 98, 104, and 106 show some metal and some non-metallic material. Door edge guards 92, 94, 96, and 98 have bands of non-metallic material of various horizontal widths extending from their reverse bends 60. Door edge guards 104 and 106 have metal bands extending from their reverse bends 60 before reaching the beginnings of their visible non-metallic material. Door edge guards 108 and 110 show only non-metallic material. Bare end surfaces 32, 34 which become the lengthwise end surfaces of a formed door edge guard may be covered with non-metallic material or painted.

Figure 40:
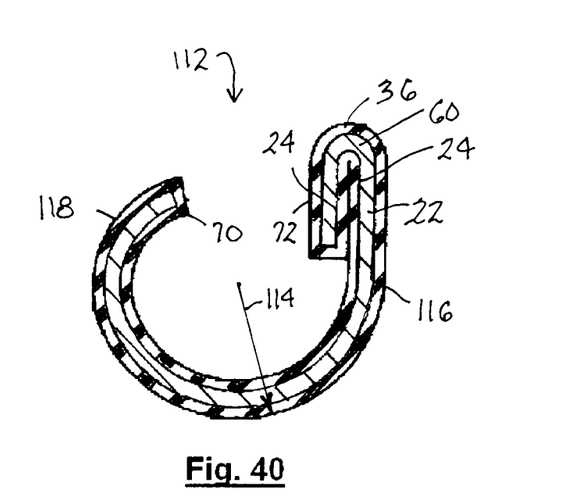
FIG. 40 is a transverse cross section view showing another door edge guard.

FIG. 40 shows another door edge guard 112 in which thicknesses of metal core 22 and non-metallic material 36 are at least approximately correct in their relative proportions. The width of the strip from which door edge guard 112 is formed is approximately 0.75 inch, and metallic core 22 has a thickness of 0.015+/−0.002 inch. Thickness of non-metallic material 36 is nominally 0.010 inch, and the edges at the corners where surfaces of core 22 meet are covered by non-metallic material at least as thick as 0.010 inch measured at 45° to those surfaces. Throat opening 74 is 0.115 inch, and the material of metal core 22 is Grade 434 stainless steel, which is widely used in the manufacture of automotive trim parts because of its excellent corrosion resistance, its ductility which allows it to be formed to shapes such as those of the disclosed door edge guards, and its ability to retain elasticity after forming which enables the disclosed door edge guards to clip onto a door edge. Those thicknesses of metal core 22 and non-metallic material 36 are representative of thicknesses of other door edge guards shown here. The grade of stainless steel also is representative of other door edge guards shown here. Throat opening and strip width of other door edge guards are determined by the shape of the transverse cross section and dimensional characteristics of the door edge. Non-metallic material is any suitable polymeric or copolymeric material which can be extruded onto the metal strip. One example is polyvinyl chloride.

Curl 62 of door edge guard 112 has a constant radius 114, measured from a center to the outer surface of non-metallic material 36 covering surface 26, and extending angularly from a location marked by reference numeral 116 to a location marked by reference numeral 118. Beyond location 118, curl 62 curls more sharply at a smaller, or progressively smaller, radius. The entire extent of curl 62 is greater than 180° as measured from location 116 to the outer surface of non-metallic material 36 covering surface 28 at first zone 70, but location 118 may be less than, equal to, or greater than 180° in any particular door edge guard.

While FIG. 40 shows reverse bend 60 to have created full surface-to-surface contact of mutually abutted surfaces of non-metallic material 36 covering surface 24, it is to be appreciated that stainless steel has some inherent springback and consequently there may be less than full surface-to-surface contact in a finished door edge guard.

Door edge guards, such as door edge guards 38, 40, and 42 for example, can be installed on a door edge 76 like the one shown in FIG. 14 by initially advancing the door edge guard toward the door edge so that the portion of second zone 72 of section 58 nearest reverse bend 60 is parallel with and comes into contact with outside-facing surface 120 before first zone 70 comes into contact with inside-facing surface 124. As the door edge guard continues to be advanced, first zone 70 comes into contact with rounded end surface 122 at a location which is more toward inside-facing surface 124 than toward outside-facing surface 120 so that further advancement of the door edge guard will cause first zone 70 to ride along rounded end surface 122 and begin expanding throat opening 74 by flexing curl 62 while second zone 72 remains flat against outside-facing surface 120 as second zone 72 rides along surface 120. As first zone 70 leaves rounded end surface 122 and begins to ride along inside surface 124, further flexing ceases, and the door edge guard can be advanced until the door edge guard abuts rounded end surface 122 as shown in FIG. 14.

Figure 41:
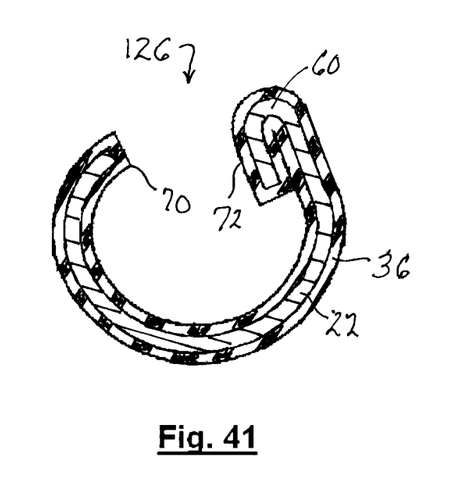
FIG. 41 is a transverse cross section view showing another door edge guard.

FIG. 41 shows a door edge guard 126 which is similar to, but differs in certain dimensional respects from, door edge guard 112. Door edge guard 126 is turned slightly counter-clockwise from the view of FIG. 40. The purpose in doing so is to enable it to be installed on a door edge because of its particular dimensions and/or those of the door edge on which it is to be installed.

The location of first zone 70 of door edge guard 126 relative to that of second zone 72 would, if door edge guard 126 were oriented to place second zone 72 flat against outside-facing surface 120 as described above for the other door edge guards, prevent first zone 70 from making initial contact with rounded end surface 122 at a location more toward inside-facing surface 124 than toward outside-facing surface 120 which would allow it to ride along rounded end surface 122 and onto inside-facing surface 124. However, by slightly turning door edge guard 126 counterclockwise as shown in FIG. 41, initial contact of first zone 70 and of second zone 72 with door edge 76 will take place on respective portions of rounded end surface 122 leading to respective inside-facing and outside-facing surfaces 124, 120 as door edge guard 126 is advanced. Curl 62 will flex to expand throat opening 74 by expanding over a greater extent of its curvature than in the case of door edge guard 112 until zones 70, 72 begin to ride along respective surfaces 124, 120, after which advancement continues until the door edge guard abuts the exterior surface of rounded end 122.

By colorizing non-metallic material, various decorative characteristics can be imparted to any door edge guard. Colors may match or contrast with a door's color. Multiple colors may be imparted to a door edge guard by selectively covering non-metallic layer 36, polyvinylchloride (pvc) for example, with an additional non-metallic layer, polyvinylfluoride (pvf) for example, of a different color.

Non-metallic layer 36 may also be painted with a paint which will adhere to the non-metallic material to achieve a color which is desired for a door edge guard to either match or contrast with a door's color. An efficient technique for doing this in a mass production setting where a door edge guard color may be selected from a wide range of colors is to extrude different colors of non-metallic material and then paint each different color of non-metallic material with a particular paint color for achieving a particular finished color. For example, a light color for non-metallic layer 36 can be painted with any of various light colored paints, and a dark colored layer, with any of various dark colored paints. In that way only a single coat of paint is used to achieve a particular finished color. After the paint is dry, a final clear-coat may be applied as a protective finish.

Exposed metal of any door edge guard may be primed with a primer coat and then painted with a paint coat to present a desired color, with the paint coat, when dry, being covered by applying a clear-coat finish. Any painting which is to be done may take place either before or after the strip has been formed to the desired transverse cross section. For example, painting may be done to individual door edge guards after they have been cut to length from the roll formed strip, or it may be done to the laminated strip before roll forming. In the later case, because the paint is applied and dried before roll forming, the paint which is used will have an appropriate degree of elasticity for roll forming.

A symmetrically opposite version of each door edge guard which has been described here is fabricated to fit the trailing edge of a left side door which is the mirror image of the right side door.

It is to be noticed that in all door edge guard embodiments first zone 70 of non-metallic layer 36 covers inner corner 68, an adjoining portion of first side surface 28, and an adjoining portion of second margin 54 along surface 24, and that a second zone 72 of layer 36 covers the surface of either first section 56 or second section 58 which faces and is nearest to inner corner 68. Throat opening 74 is the shortest distance from first zone 70 of non-metallic material at inner corner 68 to second zone 72. In that way, only non-metallic material comes into contact with opposite sides of the door edge.

A process for fabricating the longer strip, from which flat rectangular strips like strip 20 are cut, will now be explained. Grade 434 stainless steel strip is commercially available from a number of mills in various thicknesses and can be slit to a desired width by a slitting process which is typically performed by the steel supplier and not by the door edge guard manufacturer. The door edge guard manufacturer typically purchases slit steel wound in coils.

The door edge guard manufacturer applies non-metallic material to the slit steel by an extrusion or co-extrusion process. Because the slitting process may leave a small burr at a corner, such as inner corner 68, at least that corner is debarred during the door edge guard manufacturing process. Reasons for deburring will be explained later.

The manufacturing process comprises drawing the strip from a coil and running it through a succession of various operations which create a flat laminated strip which can be formed to a desired edge guard cross section. These operations include deburring at least the corner edge which will become inner corner 68, and then cleaning the strip in preparation for extrusion (or coextrusion) of the non-metallic layer onto the strip. Cleaning may be performed by thoroughly washing the strip as it passes through a bath and then completely drying the strip after it exits the bath, such as by using forced air heating. Adhesive is applied to the dry strip at locations where the non-metallic layer is to be extruded onto the steel. The temperature of the strip is gradually increased to avoid shocking the steel when hot extrudate is thereafter applied to the steel to create the non-metallic layer. After that the flat laminated strip is run through a quenching process and eventually accumulated on a take-up reel. A separator strip may be introduced into overlying relation with the strip before coiling on the take-up reel. The separator strip prevents the non-metallic layer of a succeeding convolution from sticking to a preceding convolution in case the extrudate has not completely cooled.

When the extrusion or co-extrusion process is performed, it is important that corner edges where surfaces of the steel strip meet not impede the flow of extrudate around the corner edges between the meeting surfaces. This is particularly important for the edge at inner corner 68 which is the point at which the door edge guard will apply retention force to the inside of the door edge. Deburring mitigates potential impediment by a burr which might otherwise interfere with flow of extrudate around the edge at inner corner 68 and prevent sufficient thickness of layer 36 from being created at that corner. The same is true at any other corner edge which is to be covered by extrudate.

The coiled laminated strip is uncoiled and run through a roll forming process which forms the strip to the proper transverse cross sectional shape for the door edge guard. Individual strips of proper length are then cut from the formed strip, and they may be further processed by notching and/or bending for fitting to a curved door edge.

What is claimed is:

1. A door edge guard which is self-retaining when fitted onto and protecting a trailing edge of an automotive vehicle door, the door edge guard comprising:
    a metal strip which has length, width, and thickness, a first lengthwise side surface and a second lengthwise side surface which are widthwise opposite each other, a first lengthwise margin which comprises the first lengthwise side surface, a second lengthwise margin which comprises the second lengthwise side surface, and the strip having a transverse cross section which when viewed in a direction looking at the thickness of the metal strip is seen to comprise a) the second lengthwise margin having a first section adjoining the second lengthwise side surface, a second section confronting the first section, and a reverse bend through which the first section joins the second section, b) a curl which joins the second section at a location opposite the reverse bend, which curls in excess of 180° from the second section to cause the first lengthwise side surface to face toward one of the first and second sections which is nearer the first lengthwise side surface, the second section extending linearly away from the curl to the reverse bend, the first lengthwise side surface and the first lengthwise margin meeting at an outer corner and an inner corner, the latter corner being disposed nearer the one of the first and second sections which is nearer the first lengthwise side surface, the one of the first and second sections which is nearer the first lengthwise side surface having a first flat surface which faces the first lengthwise side surface and a second flat surface which is opposite the first flat surface, the second flat surface confronting a surface of the other of the first and second sections, and c) a non-metallic layer having a first zone covering the inner corner, a portion of the first lengthwise side surface adjoining the inner corner, and a portion of the first lengthwise margin adjoining the inner corner, the non-metallic layer having a second zone covering the first flat surface, the shortest distance from the first zone at the inner corner to the second zone where the second zone covers the first flat surface being coincident with an imaginary line which extends from the first zone at the inner corner and is perpendicular to the first flat surface, the shortest distance defining a throat opening which, upon initial advancement of the door edge guard onto a trailing edge of an automotive vehicle door, will become increasingly larger as the cross section expands with flexing of the curl to cause a trailing edge of an automotive vehicle door to be gripped between the first zone at the inner corner and the second zone covering the first flat surface during final advancement of the door edge guard onto a trailing edge of an automotive vehicle door.

2. A door edge guard as claimed in claim 1 in which the first section comprises the first flat surface of the one of the first and second sections which is nearer to and faces the first zone.

3. A door edge guard as claimed in claim 1 in which the second section comprises the first flat surface of the one of the first and second sections which is nearer to and faces the first zone.

4. A door edge guard as claimed in claim 1 in which the curl curls continuously between the second section and the second lengthwise side surface.

5. A door edge guard as claimed in claim 4 in which the curl curls continuously along a constant radius.

6. A door edge guard as claimed in claim 1 in which the curl curls continuously between the second section and a location spaced from the first lengthwise side surface and from that location the curl continues in a straight line to the first lengthwise side surface.

7. A door edge guard as claimed in claim 6 in which the curl curls continuously along a constant radius from the second section to a location spaced from the first lengthwise side surface and from that location the curl continues to the first lengthwise side surface along a smaller constant radius.

8. A door edge guard as claimed in claim 6 in which the curl curls continuously along a constant radius from the second and from that location continues to the first lengthwise side surface along a progressively smaller radius.

9. A door edge guard as claimed in claim 1 in which the metal strip comprises a top surface and a bottom surface extending between the side surfaces, and the non-metallic layer covers not only the first and second zones but also covers all portions of the top, bottom and side surfaces not covered by the first and second zones.

10. A door edge guard as claimed in claim 9 further comprising an additional non-metallic layer covering at least a portion of the non-metallic layer which covers the first and second zones and all portions of the top, bottom and side surfaces not covered by the first and second zones.

11. A door edge guard as claimed in claim 1 in which the metal strip comprises a top surface and a bottom surface extending between the side surfaces, and the non-metallic layer selectively covers less than the entirety of the top, bottom and side surfaces to leave the remainder of those surfaces uncovered.

12. A door edge guard as claimed in claim 11 further comprising an additional non-metallic layer selectively covering at least a portion of the non-metallic layer which selectively covers the remainder of the top, bottom and side surfaces left uncovered.

13. A door edge guard as claimed in claim 11 further comprising a primer paint coat covering to at least some of the remainder of the top, bottom, and side surfaces left uncovered, and a paint coat of a desired color covering the primer paint coat.

14. A door edge guard as claimed in claim 11 further comprising paint of a desired color covering at least a portion of the non-metallic layer.

* * * * *